(12) United States Patent
Tokuo et al.

(10) Patent No.: US 7,370,551 B2
(45) Date of Patent: May 13, 2008

(54) GEARSHIFT OPERATING DEVICE

(75) Inventors: Kenichiro Tokuo, Hitachinaka (JP);
Masaru Yamasaki, Chiyoda (JP);
Hiroshi Kuroiwa, Hitachi (JP);
Naoyuki Ozaki, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 486 days.

(21) Appl. No.: 10/743,748

(22) Filed: Dec. 24, 2003

(65) Prior Publication Data

US 2004/0159171 A1 Aug. 19, 2004

(30) Foreign Application Priority Data

Feb. 13, 2003 (JP) .............................. 2003-034492

(51) Int. Cl.
*B60K 17/04* (2006.01)
(52) U.S. Cl. .................. 74/473.12; 74/336 R
(58) Field of Classification Search .............. 74/473.1, 74/473.12, 335, 336 R
See application file for complete search history.

(56) References Cited

U.S. PATENT DOCUMENTS

| 4,817,468 | A | * | 4/1989 | Leigh-Monstevens et al. ........................ 74/335 |
| 4,873,881 | A | * | 10/1989 | Edelen et al. ............. 74/336 R |
| 5,035,113 | A | * | 7/1991 | Simonyi et al. .............. 60/390 |
| 6,170,352 | B1 | | 1/2001 | Neubauer et al. |
| 6,227,067 | B1 | | 5/2001 | Steeby et al. |
| 6,301,537 | B1 | * | 10/2001 | Walker ........................ 701/51 |
| 6,393,928 | B1 | | 5/2002 | Watanabe |
| 7,062,986 | B2 | * | 6/2006 | Metzger et al. ............... 74/335 |

FOREIGN PATENT DOCUMENTS

| EP | 1 096 179 A2 | 5/2001 |
| GB | 1 162 010 | 8/1969 |
| GB | 2 325 714 A | 12/1998 |
| JP | 2001-141047 | 5/2001 |

\* cited by examiner

*Primary Examiner*—David M. Fenstermacher
(74) *Attorney, Agent, or Firm*—Antonelli, Terry, Stout & Kraus, LLP.

(57) ABSTRACT

To provide a small-sized and lightweight gearshift operating device that is capable of performing a gearshift operation in a short time at low power consumption, a guide slit having a plurality of slits 41 parallel with the shift fork shafts and a plurality of slant slits 42 concentrated to a neutral point 43 from them is employed to guide a follower 33. The follower 33 is operated along the guide slit, thus the number of times of starting and stopping operations of the motor for the shift operation is reduced, and the load of the actuator for the selection operation is reduced.

13 Claims, 8 Drawing Sheets

SELECTION DIRECTION

SELECTION DIRECTION

SHIFT DIRECTION

GEARSHIFT OPERATING DEVICE

BACKGROUND OF THE INVENTION

The present invention relates to a gearshift operating device of the type provided in an automatic manual transmission (hereinafter referred to as an AMT) for automatically performing a gearshift operation of a transmission having a synchro-mechanism or a dog-clutch; and, more particularly, the invention relates to speedup of the gearshift operation and realization of miniaturization and lightweight formation of the device.

Generally, a gearshift operating device which is used to perform the shift selection operation of a normally contact-mesh type transmission has a shift finger which selectively engages to a plurality of shift fork shafts so as to join or dejoin a gear, an actuator for driving the shift finger in the shift direction, a sensor for detecting a displacement of the shift finger in the shift direction, an actuator for driving the shift finger in the selection direction, and a sensor for detecting a displacement of the shift finger in the selection direction. Individual actuators (for example, a motor) for performing these operations in the shift direction and selection direction, respectively, can be electrically controlled and can independently perform the shift operation (joining and dejoining of the gear) and the selection operation (selection of the shift fork shafts), respectively.

On the other hand, in a normally contact-mesh type transmission, a shift pattern, which is known as type H or double H, is generally widespread, and, in such a device, the shift finger draws a trace following the alphabetic character H to perform the shift and selection operations. Namely, the shift finger operates in a direction parallel to the shift fork shaft to perform the shift operation (joining and dejoining of the gear); and, in the neutral position, it operates in a direction perpendicular to the shift operation to perform the selection operation. See, for example, Patent Document 1 (Japanese Application Patent Laid-open Publication No. 2001-141047 (pages 4 and 5, FIG. 3)).

In the aforementioned gearshift operating device, the actuators performing the shift operation (joining and dejoining of the gear) and the selection operation are sequentially operated, so that the operation of switching the gear takes a lot of time. Namely, when switching gears, the motor for the shift operation is driven first to disengage the gear; and, then, when the gear is set in the neutral position, the motor for the selection operation is driven. When the shift finger is set in a position relating to the joining and dejoining part of a desired shift fork shaft, the motor for the shift operation is driven to push the shift fork shaft into the gear joining position.

In this operation, to perform the gear dejoining operation, the shift motor is accelerated and decelerated, and to perform the selection operation, the selection operation motor is accelerated and decelerated, and to perform the gear joining operation finally, the shift motor is again accelerated. In the case of accelerating and decelerating the motor three times in one gearshift operation in this way, the gearshift time can not be shortened, and there is a possibility that the power consumption may be increased. The length of time required for the gearshift operation contributes in actual car operation to a problem of uncomfortableness in the ride at the time of gearshift operation or a speed up of the engine (an increase in fuel expenses).

Further, the conventional gearshift operating device is generally large in shape and heavy in weight, so that it is difficult to mount in a car having a small space around the transmission, like a small-sized car.

SUMMARY OF THE INVENTION

An object of the present invention is to provide a small-sized and lightweight gearshift operating device that is capable of quickly switching the gears with a low power consumption.

To accomplish the above object, the present invention relates to a gearshift operating device of the type employed in a contact-mesh type transmission for driving a shift selection shaft in a first direction and in a second direction which is different from the first direction to perform the gear selection and gear joining and dejoining operations, which device is structured so as to perform gear selection and gear joining and dejoining operations by driving a first actuator to move the shift selection shaft in the first direction and simultaneously driving a second actuator which moves the shift selection shaft in the second direction, thereby driving the shift selection shaft in the first direction and simultaneously driving it in the second direction.

Further, the present invention relates to a gearshift operating device of a normally contact-mesh type transmission having a shift finger selectively joining to or dejoining from the shift fork shafts of the normally contact-mesh type transmission, the shift selection shaft including the shift finger, at least one electrically controllable driving means for driving the shift selection shaft in a direction (the shift direction) parallel with the shift fork shafts, at least one electrically controllable driving means for driving the shift selection shaft in a direction (the selection direction) perpendicular to the shift fork shafts, a follower forming a part of the shift selection shaft, and a guide slit engaged by the follower to guide the operation of the shift selection shaft, wherein the guide slit has a plurality of parallel parts that extend in parallel with the shift fork shafts and a plurality of slant parts connected so as to come to a point at the neutral position from the plurality of parallel parts.

Accordingly, as the follower moves along the guide slit, the shift finger can move in the shift direction and simultaneously in the selection direction, so that the number of starting and stopping operations of the motor for performing the shift selection operation is reduced, and the time required for the gearshift operation is shortened. Further, the number of starting and stopping operations of the shift operation motor is also reduced, so that the power consumption is reduced.

Furthermore, when the follower moves obliquely along the slit, the driving force in the shift direction also acts partially in the selection direction, so that the burden imposed on the selection operation actuator is lightened, whereby the selection operation actuator can be miniaturized and lightened.

Or, in place of the actuator for driving the shift finger in the selection direction, a simple actuator for applying only pressing force in the selection direction may be provided. By doing this, in the same way as with the aforementioned arrangement, a high-speed gearshift operation can be performed, and the actuator for performing the gear selection operation at the neutral position can be omitted, so that miniaturization of the device, reduction in weight and low cost can be realized.

Or, in place of the actuator for driving the follower in the selection direction, a gate mechanism capable of being electrically opened or closed may be provided in the slit. By doing this, instead of applying a pressing force in the selection operation direction for gear selection, the slit in which the follower can be moved is specified, thus the gear can be selected. By doing this, in the same way as with the aforementioned arrangement, a high-speed gearshift operation can be performed, and the actuator for performing the gear selection operation at the neutral position can be omitted, so that miniaturization of the device, and reduction in weight and cost can be realized.

Furthermore, the clearance of the joint between the shift finger and the shift fork shafts is almost equal to or wider than the width of the shift finger. By doing this, in the gear dejoining operation, the concerned shift fork shaft can be moved almost to the neutral position, and in the gear joining operation, interference by unnecessary shift fork shafts can be avoided.

Furthermore, the follower width has some clearance relative to the width of the guide slit. By doing this, in the same way as with the aforementioned arrangement, in the gear dejoining operation, the concerned shift fork shaft can be moved almost to the neutral position, and in the gear joining operation, interference by unnecessary shift fork shafts can be avoided.

DESCRIPTION OF THE INVENTION

The embodiments of the present invention will be explained hereunder with reference to the accompanying drawings.

Figure 1:
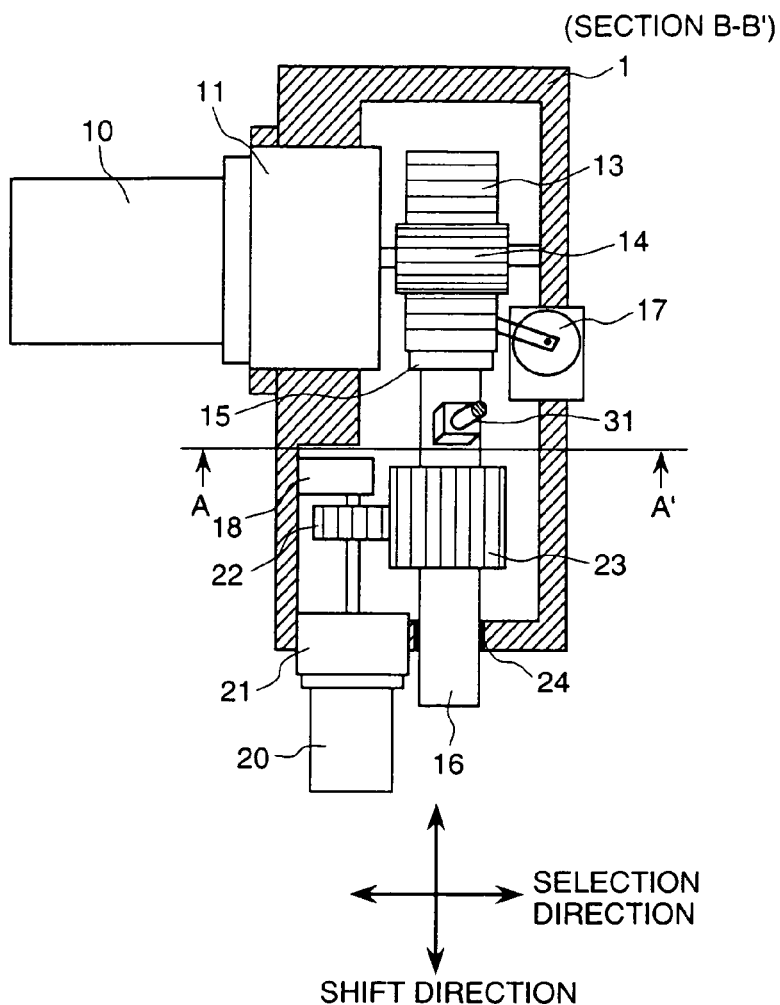
FIG. 1 is a cross section view from the top, as seen along line B-B' in FIG. 2, showing an embodiment of the present invention.
Figure 2:
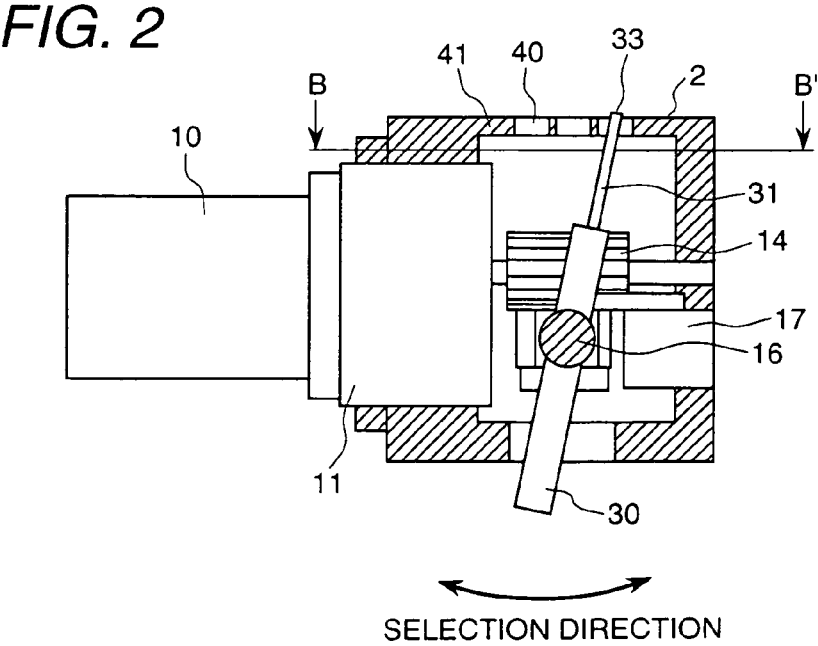
FIG. 2 is a cross section view from the side, as seen along line A-A' in FIG. 1, showing an embodiment of the present invention.

FIGS. 1 and 2 show an example of a gearshift operating device for performing the gearshift operation of a normally contact-mesh type transmission having five forward speeds and one reverse speed, in which FIG. 1 is a transverse cross sectional view thereof, and FIG. 2 is a longitudinal cross sectional view thereof.

A motor 10 for the shift operation, which is installed on a housing 1 of the gearshift operating device, has the driving torque thereof amplified by a planetary speed reducer 11, and this driving torque is converted to direct-acting power via a direct-acting conversion mechanism, for example, a rack 13 and a pinion 14, so that the force acts in the translation direction on a shift selection shaft 16, which is supported via a rotary coupling 15. The shift selection shaft 16 is attached to the housing 1 by bearings 24 for rotation and translation.

A motor 20 for the selection operation, which is installed on the housing 1 of the gearshift operating device, has the driving torque thereof amplified via a planetary speed reducer 21, and this driving torque is converted to a rotary force on the shift selection shaft 16 via a gear 22 and a gear 23 to effect axial rotation thereof. The shift selection shaft 16 has an action force applied thereto in the translation direction by the motor 10 for the shift operation and has an action force applied thereto in the rotational direction by the motor 20 for the selection operation.

The shift selection shaft 16 is provided with a shift finger 30, which is selectively engaged to or disengaged from the shift fork shafts of the transmission; and, the shift finger 30, in the same way as with the shift selection shaft 16, has an action force applied thereto in the translation direction by the motor 10 for the shift operation and an action force applied thereto in the rotational direction by the motor 20 for the selection operation. Further, the housing 1 includes a displacement sensor 17 for measuring the displacement of the shift selection shaft 16 in the translation direction and a rotational angle sensor 18 for measuring the rotational angle of the shift selection shaft 16.

Figure 3:
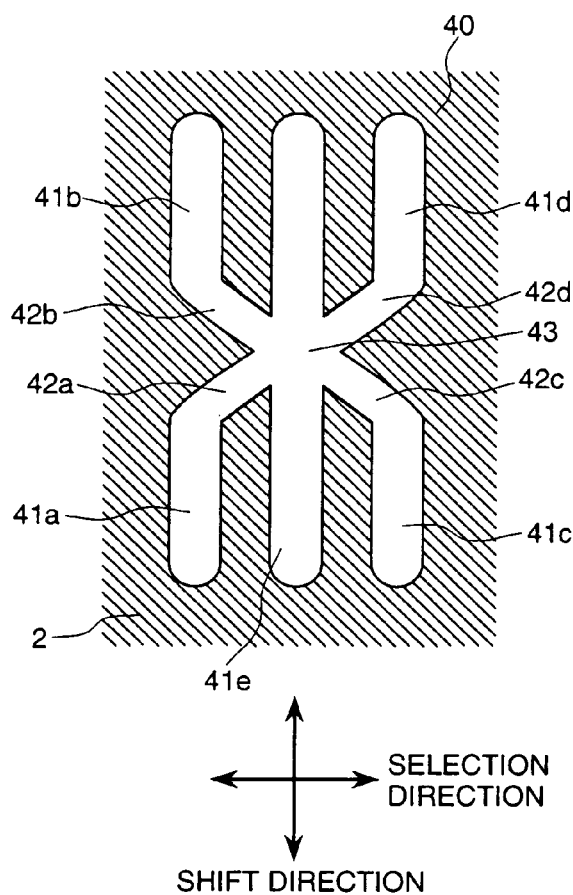
FIG. 3 is a diagram showing the shape of a guide slit as employed in an embodiment of the present invention.

On the other hand, on the upper part of the shift finger 30, a follower arm 31 is provided integrally therewith, and it passes through or is inserted into a guide slit 40 that is formed in a guide plate 2 provided on the top of the housing 1. In this case, the guide slit 40 is a slit formed in the guide plate 2 arranged on the top of the housing 1. On the part of the follower arm 31 which is in contact with the guide slit, a follower 33 is formed. FIG. 3 shows an example of the shape of the guide slit 40. The guide slit 40 has a plurality of parallel parts 41a to 41f and a plurality of slant parts 42a to 42d that converge so as to come to a point from the plurality of parallel parts. Hereinafter, the point where the slant parts 42a to 42d are focused will be referred to as a neutral point 43.

The plurality of parallel parts 41a to 41f are arranged in parallel with the shift fork shafts. Hereinafter, this direction will be referred to as a shift direction. Further, the direction perpendicular to the shift direction shown in FIG. 3 will be referred to as a selection direction. In this case, even if the parallel parts 41a to 41f are not strictly parallel with the shift fork shafts, the functionality is not questionable. The guide slit 40 guides the follower 33. Therefore, the shift finger 30, which is integral with the follower arm 31, and the shift selection shift 16, which is formed integrally with the shift finger 30, are also guided by the shape of the guide slit 40. In this case, the follower 33 is smoothly guided by the guide slit 40, so that it is desirable that the cross section thereof is circular, or that both ends thereof in the shift direction are constituted by faces having a small curvature.

Figure 4:
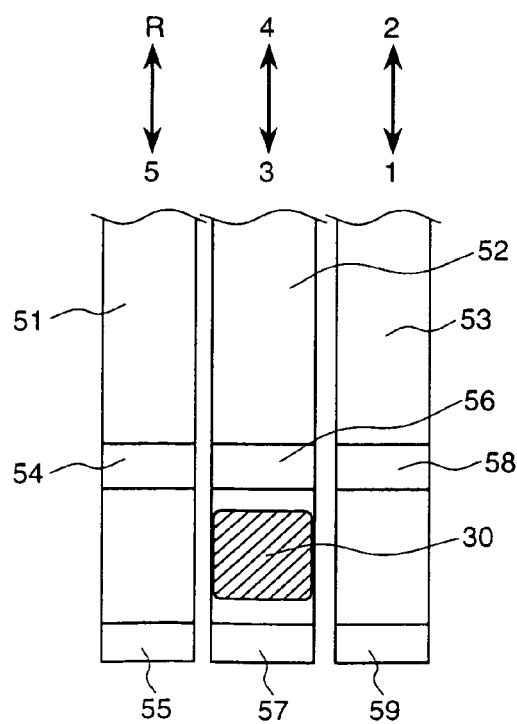
FIG. 4 is a diagram showing a part of the operation of the gearshift operating device of the present invention.

FIG. 4 shows the relationship between the shift finger 30 and the shift fork shafts of the transmission. A general normally contact-mesh type transmission of five forward speeds and one reverse backward speed has three shift fork shafts 51, 52, and 53. The respective shift fork shafts are operated axially, so that the gear is joined or dejoined. For example, in a general normally contact-mesh type transmission of five forward speeds and one reverse speed, the directions of operation of the shift fork shafts and the joining gear are in the relation indicated by the movements shown in FIGS. 5(a) to 5(e).

The shift finger 30 bears against any of the projections 54, 55, 56, 57, 58 and 59 of the shift fork shafts, as seen in FIG. 4, thereby to axially operate any of the shift fork shafts 51, 52, and 53 to join or dejoin a gear. For example, the shift finger 30 bears against the projection 59 of the shift fork shaft 53 and moves it in the first speed direction shown in the drawing, so that the first speed gear is joined. Thereafter, the shift finger 30 bears against the projection 58 of the shift fork shaft 53 and moves it in the second speed direction shown in the drawing, so that the first speed gear is dejoined to neutral and then the second speed gear is joined. It will be noted that, since the follower arm 31 is on the opposite side of the shift finger 30 and the shift selection shaft 16, the follower arm 31 operates axially symmetrically with respect to the shift finger 30.

Next, the operation and effects of this embodiment will be explained by referring to an example of a gearshift operation in which gear change is effected from the second gear to the third gear.

FIGS. 5(a) to 5(e) are diagrams showing the operations of the shift finger 30 and the shift fork shafts 51, 52, and 53 in time series when the transmission changes the speed from the second gear to the third gear. Further, FIG. 6 is a diagram showing the position of the follower 33 corresponding to the timing thereof in the guide slit according to the movements shown in FIGS. 5(a) to 5(e). Further, FIGS. 7(a) to 7(e) are longitudinal cross sectional views of the gearshift operating device showing the inclination of the follower arm 31 corresponding to the positions shown in FIGS. 5(a) to 5(e) and 6.

Figure 5A:
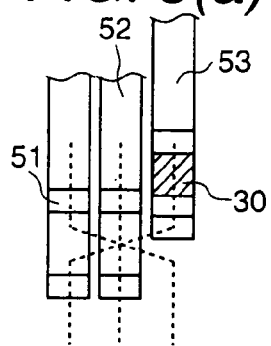
FIGS. 5(a) to 5(e) are diagrams showing operations of the shift fork shafts operated by the gearshift operating device of the present invention.
Figure 6:
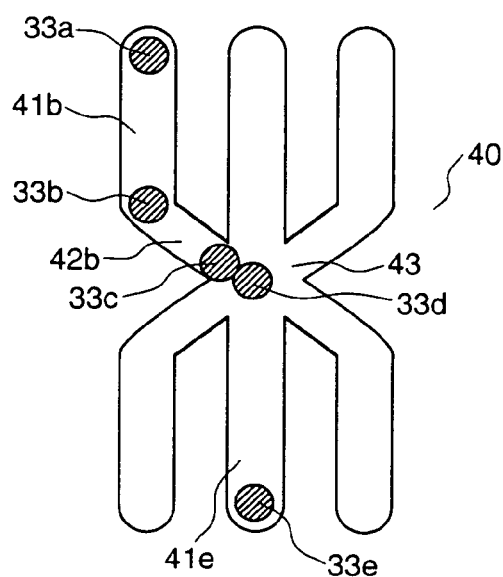
FIG. 6 is a diagram showing a trace of the follower of the gearshift operating device of the present invention.

When the gear of the transmission is joined to produce the second speed, the shift finger 30, as shown in FIG. 5(a), holds the shift fork shaft 53 in the joint position of the second speed gear. Since the follower 33 is axially symmetric with respect to the shift finger 30, as shown in FIG. 6, it is at a position 33a in the guide slit 40 at this time.

Figure 5B:
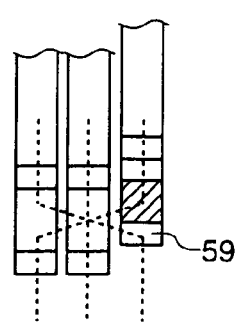

The dejoining operation for the second speed gear is performed by driving the motor 10 for the shift operation, thereby applying a driving force in the shift direction to the shift selection shaft 16. When thrust is applied to the shift selection shaft 16 in the shift direction, thrust is also applied to the shift finger 30, which bears against the projection 59 of the shift fork shaft 53 and pushes the shift fork shaft 53 in the gear dejoining direction. The shift fork shaft 53 is pushed by the shift finger 30, and, as shown in FIG. 5(b), it is moved in the shift direction. At this time, the follower 33 moves on the parallel part 41b of the guide slit 40 in the shift direction. The position of the follower 33 at this time is indicated by 33b shown in FIG. 6.

When an operation force is continuously applied in the shift direction, the follower 33 moves on the slant part 42b shown in FIG. 6. At this time, the follower 33 is guided by the slant part 42b of the guide slit 40, so that regardless of application of the driving force in the selection direction, the follower 33 moves along the slant part 42b.

When the follower 33 moves obliquely, the follower arm 31 and the shift selection shaft 16 rotate and move at the same time in the shift direction. Simultaneously, the shift finger 30 moves obliquely in the opposite direction of the follower 33 and pushes the shift fork shaft 53 in the shift direction while also moving in the selection direction.

Figure 5C:
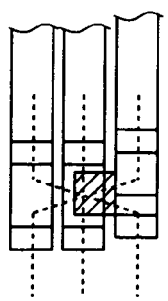
Figure 7A:
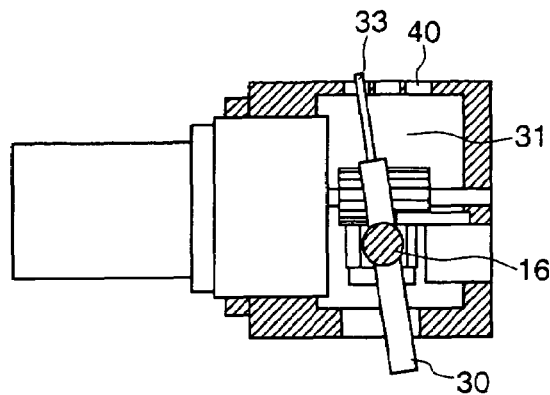
FIGS. 7(a) to 7(e) are cross sectional views showing the motion of the follower arm of the gearshift operating device of the present invention.
Figure 7B:
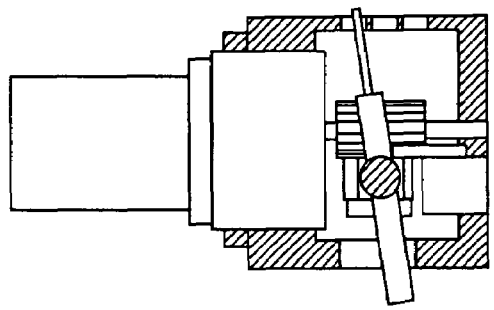
Figure 7C:
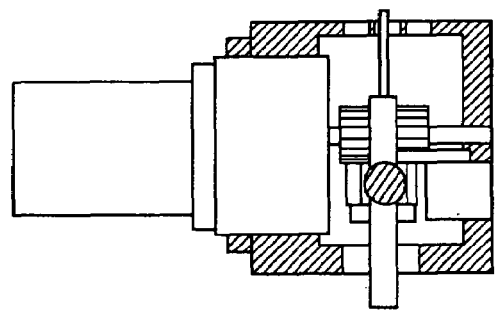

The shift finger 30 moves sideways in the direction of separation from the shift fork shaft 53, so that as shown in FIG. 5(c), the contact with the projection 59 of the shift fork shaft 53 is released at a certain position. At this time, the second speed gear is dejoined already, and the shift fork shaft 53 is almost in the neutral position. The position of the follower 33 in this state is indicated by 33c in FIG. 6, and the longitudinal cross sectional view of the gearshift operating device showing the state of inclination of the follower arm 31 is shown in FIG. 7(c).

Further, when the size of the gap between the projection of the shift fork shaft and the shift finger 30 and the trace of the slant part of the guide slit 40 are properly set, the shift fork shaft 53 can be disengaged from the shift finger 30 in the neutral position. Even if the shift fork shaft 53 is disengaged from the shift finger 30 in a position different from the correct neutral position, the shift fork shaft 53, as long as no pressing force is acting on it from the shift finger 30, is not joined to the first speed gear or second speed gear and is set almost in the neutral position by the positioning mechanism arranged in the transmission.

Figure 5D:
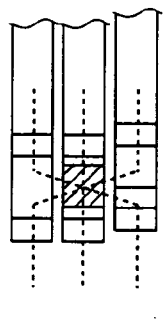
Figure 7D:
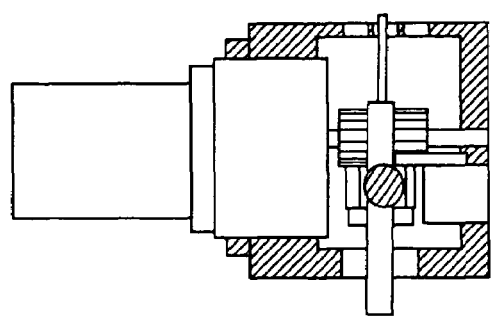
Figure 7E:
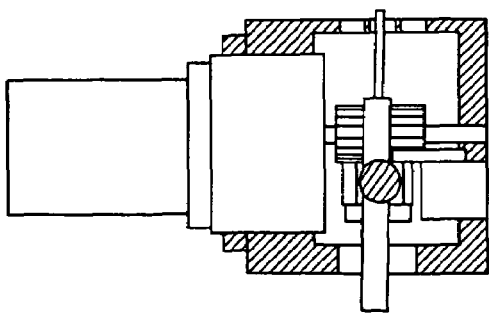

Next, as indicated at 33d in FIG. 6, when the follower passes from the slant part 42b and approaches the neutral point 43, the motor 20 for the selection operation is operated to control movement of the follower 33 so that it is arranged in line with the parallel part 41e in the shift direction. At this time, as shown in FIG. 5(d), the shift finger engages on the shift fork shaft 52, and, when it moves straight on in the shift direction as it is, it bears against the projection 57, thereby pushing the shift fork shaft 52. Further, the position of the follower arm is as shown in FIG. 7(d).

Figure 5E:
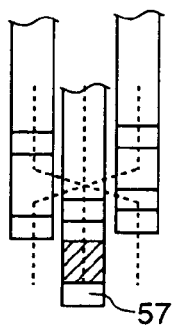

Finally, when the follower 33 is in the aforementioned position and the motor for the shift operation is operated to drive the shift selection shaft 16 in the shift direction, the follower 33 enters the parallel part 41e and slides along the central slit 41e up to the position indicated by 33e in FIG. 6. At this time, as shown in FIG. 5(e), the shift finger bears against the projection 57 of the shift fork shaft 52 and pushes the shift fork shaft 52 up to the joint position of the third speed gear.

By the aforementioned operation, the operation for shifting from the second gear to the third gear is performed.

Next, the operation for shifting from the second gear to the first gear or the fifth gear will be explained. In the course of dejoining the second speed gear, the aforementioned procedure is performed. When the follower 33 passes through the slant part 42b, as shown in FIG. 6, and reaches the position 33d (in the neighborhood of the neutral point 43), the motor 20 for the selection operation is operated to move the follower 33 to the entrance of the slant part 42a (when changing to the first speed), as shown in FIG. 3, or to the slant part 42c (when changing to the fifth speed).

When the follower 33 passes through the slant part 42a or 42c and moves to the parallel part 41c or 41a, respectively, the shift fork shaft 53 or the shift fork shaft 51 is shifted and the first speed or the fifth speed gear is joined. At this time, the follower 33 is guided by the slant part 42a or 42c, so that in response only to the operation force in the shift direction, the follower 33 can move obliquely. The reason for this is that the force required for the shift operation is generally larger than the force required for the selection operation, so that the selection operation can also be performed by the motor for the shift operation.

In this series of operations, the motor 10 for the shift operation can complete the gearshift operation without stopping halfway. Therefore, the gearshift time is shortened and the energy required for acceleration and deceleration of the motor can be reduced.

Further, when changing the speed from the second gear to the fourth gear or the reverse gear, in the course of completion of the dejoining operation for the second speed gear, the aforementioned procedure is performed. Namely, when the follower 33 reaches the position 33d shown in FIG. 6, the motor 20 for the selection operation is operated to move the follower 33 to the entrance of the parallel part 41f (when changing to the fourth speed) or to the slant part 42d (when changing to the reverse speed). Thereafter, when the motor 10 for the shift operation is rotated reversely, the follower 33 passes through the parallel part 41f or the parallel part 41d, moves on the parallel part 41f or 41d, operates the shift fork shaft 52 or 51, and joins the fourth speed gear or reverse-speed gear.

When changing the speed from the other gears, the gearshift operation from the second gear is similarly performed. Namely, the motor 10 for the shift operation is operated first to generate a driving force in the shift direction, and the follower 33 is guided along the guide slit 40 and moved to the neutral point 43. At this time, the shift finger 30 bears against a projection of any of the shift fork shafts and operates the concerned shift fork shaft until the gear is dejoined. Next, the motor 20 for the selection operation is operated in the neighborhood of the neutral point 43 to move the follower 33 to the entrance of a desired guide slit. Finally, the motor 10 for the shift operation is driven to guide and shift the follower 33 in the guide slit and to join a desired gear.

When looking back at the aforementioned operation, regarding the gear dejoining operation, the follower 33 is guided both obliquely and linearly by the guide slit 40, so that when an operation force is just applied in the shift direction, even if no or a small operation force is applied in the selection direction, the follower 33 can be moved to the neutral point 43. The force required for the selection operation is generally smaller than the force required for the shift operation, so that the motor for the shift operation also can be used for the selection operation.

Further, regarding gear selection, the follower 33 need be operated only through a minute distance in the selection direction when positioned at the neutral point so as to be moved to the entrance of any of the neighboring slits. Further, after selection positioning, when the follower 33 enters the slant part in response to the shift operation, the follower 33 is guided obliquely by the guide slit 40, so that using only the operation force in the shift direction, the follower 33 can be operated in the selection direction. Therefore, in gear dejoint and gear joint operations, the operation force in the selection direction is not necessary and the moving distance in the selection operation is very small, so that the force of the actuator for the selection operation is weaker than that of the actuator for the selection operation of a conventional gearshift operating device, with the result that a narrow use range can be applied.

Further, when the follower 33 passes through the slant part and performs a gear dejoining operation, the follower 33 moves in the shift direction along the guide slit and simultaneously moves in the selection direction, so that the conventional operation of dejoining the gear first, stopping in the neutral position, and performing the selection operation next is not required.

Similarly in the gear joining operation, when the follower passes through any of the slant parts from the neutral point and moves to a parallel part, the follower 33 moves in the selection direction along the guide slit and simultaneously moves in the shift direction, so that the conventional operation of finishing the selection operation and then starting the actuator for the shift operation is not required.

Therefore, in the gearshift operating device having a guide slit formed in accordance with the present invention, every time gear dejoint, gear selection and gear joint operations are performed, the actuator used for the shift or selection operation is not required to repeatedly start or stop, and the gearshift operation is performed by continuously driving the actuator for the shift operation, so that the gearshift operation time as a whole can be shortened greatly.

Further, the number of starting and stopping operations of the motor 10 for the shift operation is reduced, so that the power consumption can be controlled. For example, there is a case, like the gearshift operation which calls for shifting from the first speed gear to the third speed gear, in which the direction of operation of the actuator for the shift operation is reversed once at the neutral point 43, so that the operation is stopped. Nevertheless, the number start and stop operations is smaller than that of the gearshift operation according to the conventional double H pattern by one time, and the operation time is short.

As described in the aforementioned embodiment, according to the present invention, the gearshift operating device is provided with a guide slit having a slant part, so that by using only a driving force in the shift direction, the shift finger 30 can be driven in the selection direction. Therefore, the actuator for the selection operation just performs a minute positioning operation at the neutral point, so as to select a gear.

Figure 8:
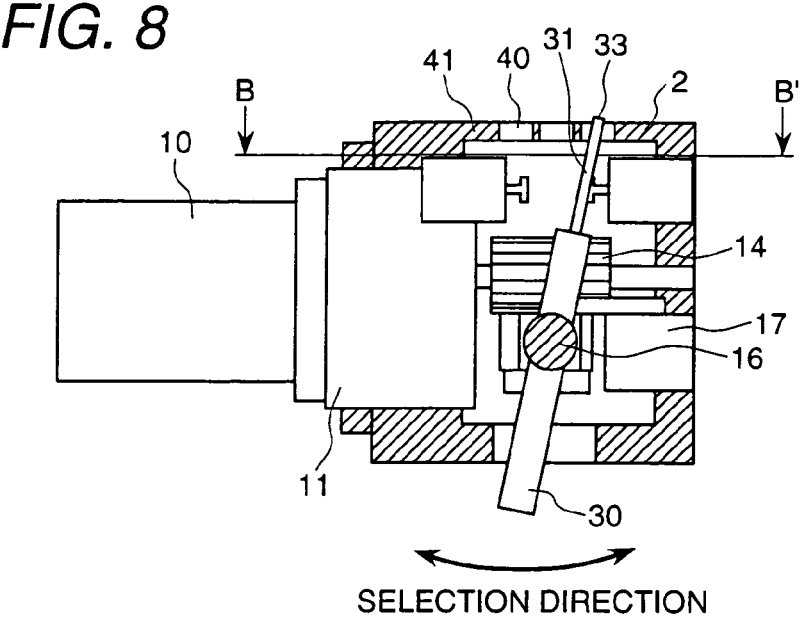
FIG. 8 is a cross section view from the top, as seen along line A-A' in FIG. 9, showing an embodiment of the present invention.
Figure 9:
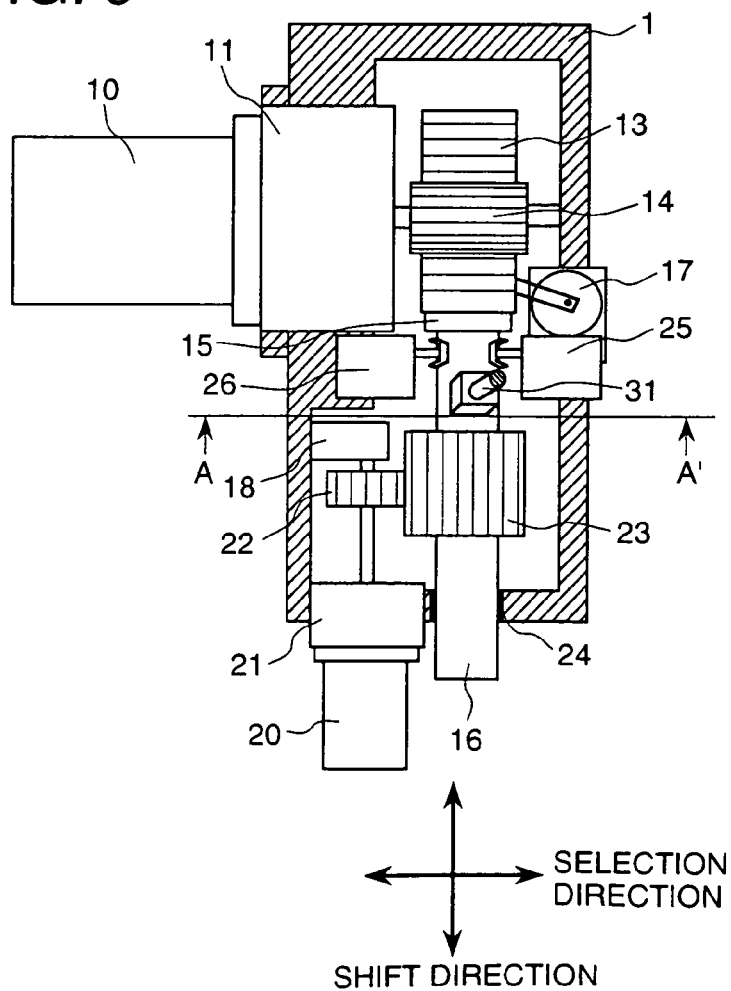
FIG. 9 is a cross section view from the side, as seen along line B-B' in FIG. 8, showing an embodiment of the present invention.

Next, an embodiment will be described in which an actuator is provided to supply a pressing force on the basis that the stroke of an actuator necessary for the selection operation is short. For this purpose, a solenoid is used, as shown in FIG. 8. FIG. 9 is a longitudinal sectional view of the gearshift operating device of FIG. 8.

At the time of gear selection, when the follower 33 is pressed toward a desired slit to provide an operation force in the shift direction, the follower 33 can be moved to the desired slit. Actuators 25 and 26 supply a pressing force to the follower arm 31 in the neighborhood of the neutral point 43.

Figure 10:
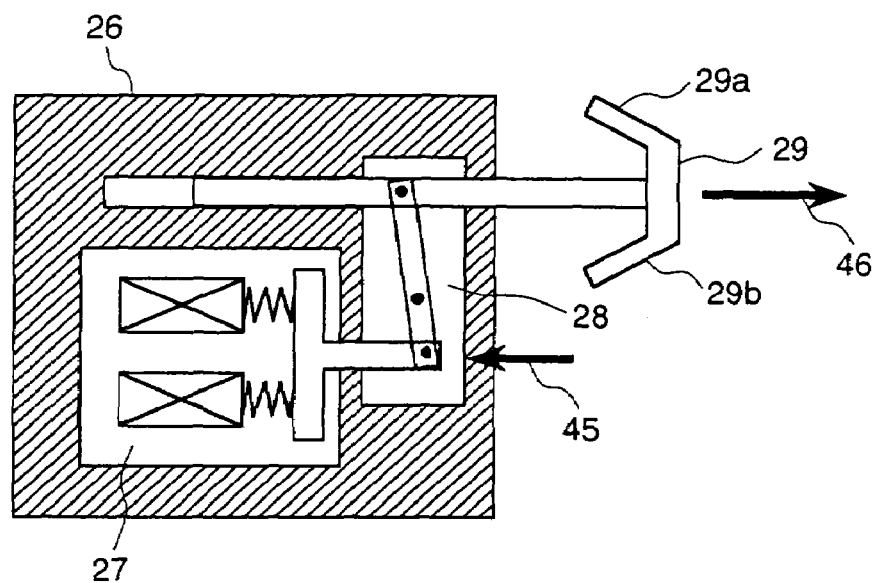
FIG. 10 is a diagram showing the pressing mechanism constituting an embodiment of the present invention.

The actuators 25 and 26, for example, as shown in FIG. 10, are constructed such that a link mechanism 28 is installed in a pull-type solenoid 27. When the pull-type solenoid 27 is supplied with a current, a pressing face 29 is pushed out to apply a pressing force to the follower arm. The follower arm has a pressing force applied thereto only in the neighborhood of the neutral point 43, so that the stroke of the actuators 25 and 26 may be short. Further, to prevent the pressing face 29 from disturbing the follower arm when the follower is returned from a gear joint position to the neutral point 43, it is effective to form slopes 29a and 29b on the pressing face 29.

By use of a mechanism using a solenoid, the motor for the selection operation can be eliminated, and the gearshift operating device can be miniaturized and lightened, and the cost can be decreased. Further, such a solenoid is highly responsive, so that a gear can be selected at high speed at the neutral point 43.

The aforementioned embodiment is directed to the use of a structure using a planetary speed reducer for the speed reducer and a rack and pinion for the motion conversion mechanism. However, the gearshift operating device of the present invention may be formed by using machine elements having a similar speed reduction or motion conversion function, such as a worm gear or a spur gear for the speed reducer and a ball screw for the motion conversion mechanism.

Figure 14:
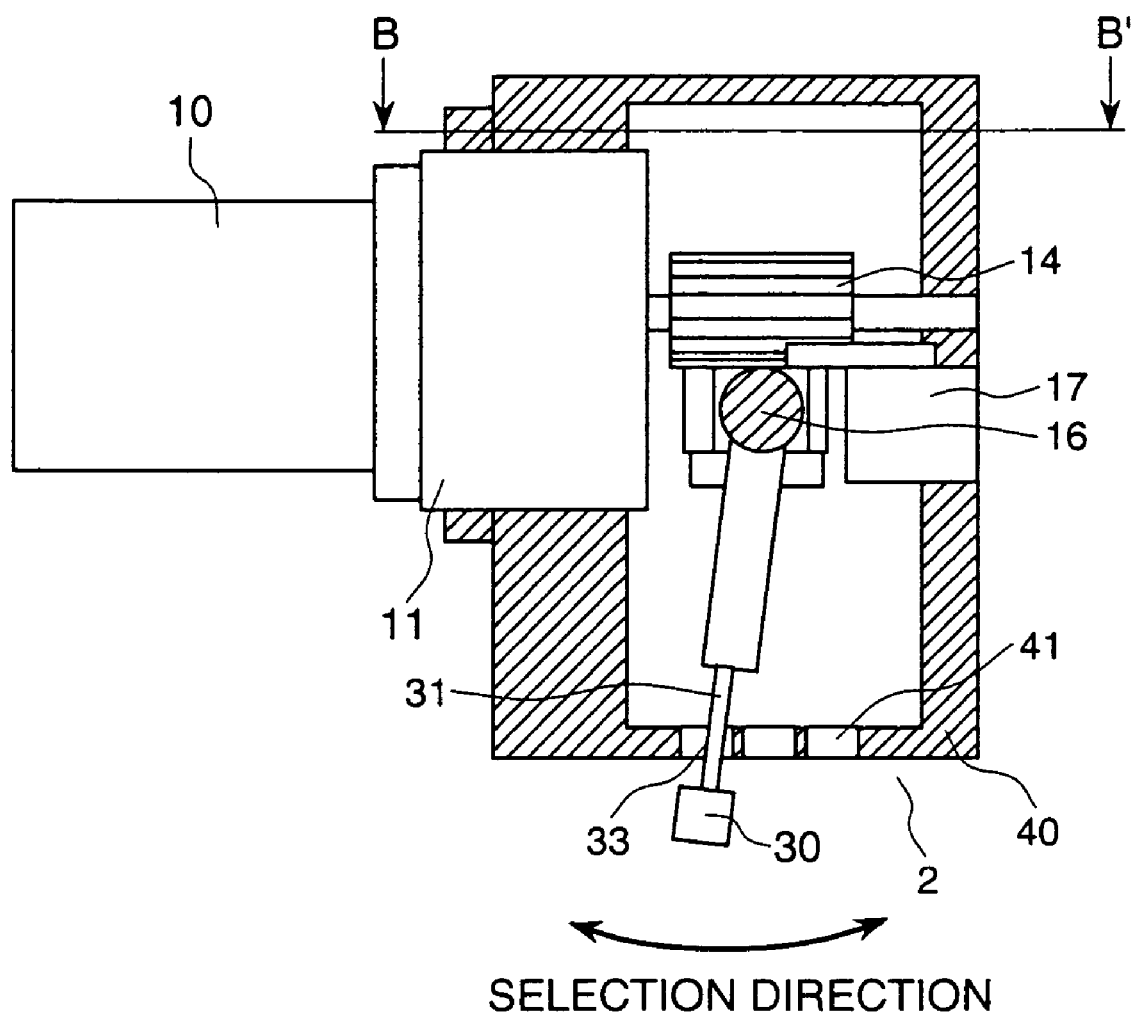
FIG. 14 is a cross section view from the side, as seen along line A-A' in FIG. 1, showing a modified embodiment of the present invention.

The aforementioned embodiment is directed to an example in which the guide slit 40 is formed on the top of the gearshift operating device. However, the guide slit may be arranged on the bottom of the gearshift operating device. A longitudinal cross sectional view of an example of such a configuration is shown in FIG. 14. The basic constituent parts thereof are the same as those shown in FIG. 2. As seen in FIG. 14, the guide plate 2 forming the guide slit 40 and the follower 33 guided by the guide slit 40 are arranged at the bottom of the housing 1 of the gear shift operating device. In this case, the guide slit 40 is arranged in the same direction as that of the shift finger 30 and the shift selection shaft 16, 50 that the trace of the shift finger 30 and the trace of the follower 33 are similar to each other. The slit shape when the guide slit 40 is arranged on the bottom is line-symmetric to that when it is arranged on the top.

Figure 11:
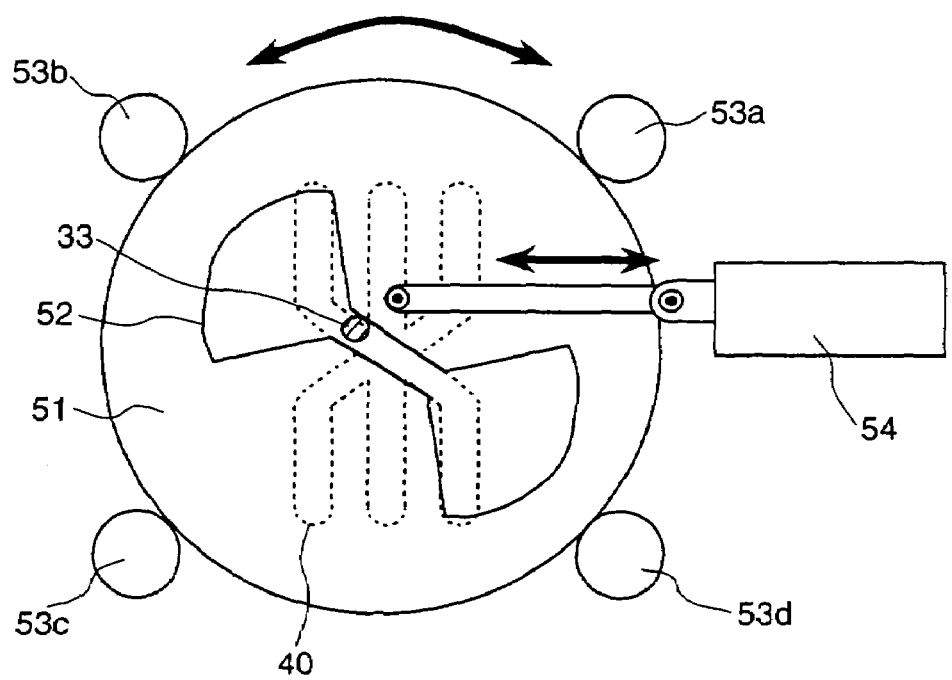
FIG. 11 is a diagram showing the guide mechanism constituting an embodiment of the present invention.

Next, as another means for gear selection at the neutral point 43, a rotatory plate having a slit can be employed, as shown in FIG. 11. This mechanism may be arranged on the top or bottom of the guide plate 2. For reference, the corresponding guide slit 40 is indicated by a doffed line. In this example, a rotary plate 51 is installed for rotation on the housing 1, for example, by support portions 53a to 53d, and it is rotated by an actuator 54 for effecting a rotation operation. A slit 52 is provided in the rotary plate 51 in the form of a linear slit, for example, having a varying width through which the follower can pass at the center and at both ends thereof. The rotary plate 51 limits the movable range of the follower arm together with the guide slit 40 to guide the follower 33.

When the follower 33 is located at the neutral point 43, the actuator 54 for the rotation operation rotates the rotary plate 51 to determine the orientation, direction of the slit 52. When the rotary plate 51 is rotated so that the follower 33 moves toward a desired guide slit, the gear to be selected can be optionally determined.

Also, in this embodiment, the load required for the rotation operation is lighter than the load required for the conventional selection operation, so that the actuator required for the conventional selection operation can be miniaturized and lightened and the whole gearshift operating device can be miniaturized and lightened.

Figure 12:
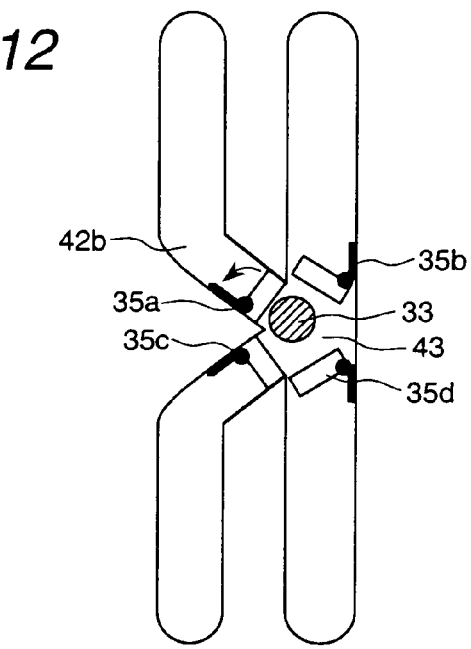
FIG. 12 is a diagram illustrating the operation of an embodiment of the present invention.

As another method which is different from the aforementioned for optionally selecting a gear from the neutral point, there is a method which involves the use of an electrically controllable gate at each junction of a guide slit. For purposes of explanation, as shown in FIG. 12, an example of a guide slit having four branch slits is used. Electrically controllable gates 35a to 35d are arranged at the respective entrances branching to the respective slits from the neutral point 43 on the guide slit 40. Each gate is opened by power supply to the gate and dosed by stopping power supply to the gate. For example, when leading the follower 33 from the neutral point 43 to the slant part 42b, only the gate 35a arranged at the entrance of the slant part 42b is opened and the other gates 35b to 35d are closed.

And, when a driving force in the shift direction is applied to the follower 33, the follower 33 is guided by the slant part of the closed gate 35b, passes through the opened gate 35a, and moves to the slant part 42b. The subsequent gear joining operation is the same as that of the aforementioned embodiments.

Figure 13A:
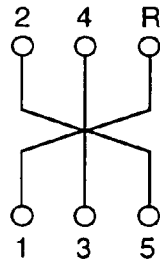
FIGS. 13(a) to 13(f) are diagrams showing examples of the shape of the guide slit of the present invention.
Figure 13B:
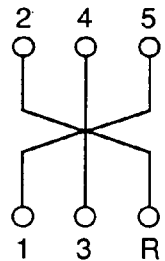
Figure 13C:
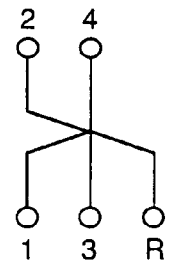
Figure 13D:
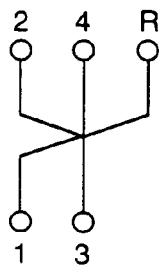
Figure 13E:
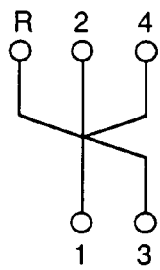
Figure 13F:
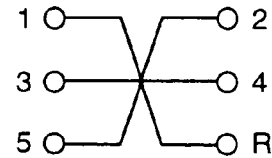

In the embodiments shown in FIGS. 1 to 11, as an example of a shift pattern of a general normally contact-mesh type transmission having five forward speeds and one reverse speed, a shift pattern in a shape as shown in FIG. 13(a) is indicated. However, with respect to the shift pattern of an actual transmission having five forward speeds and one reverse speed, as shown in FIG. 13(b), there exists a shift pattern in which the relationship of the fifth and the reverse speed is reversed. In such a case, the basic method of operation is the same as that of the aforementioned embodiments, and the present invention can be applied with similar effects. Further, when the present invention is to be applied to a normally contact-mesh type transmission of four forward speeds and one reverse speed, the shift patterns shown in FIGS. 13(c) to 13(e) may be used.

Regardless of the arrangement of the position of the reverse gear, when the shape of the guide slit is determined so as to move the shift finger to the desired position, the gearshift operating device of the present invention can be realized. In all cases, the device has slant slits, comprising a number of slits parallel with the shift fork shafts equal to the number of gears, for bringing them to the neutral point. Thus, with respect to the gearshift operation, in all cases, the follower 33 commonly moves obliquely or straight on toward the neutral point, and the follower 33 is commonly operated minutely in the selection direction at the neutral point to select a gear.

Further, in the shift pattern of a FF car, the shift and selection directions are different from those of the shift pattern of a regular FR car. However, in such a pattern as well, for example, by use of the shape shown in FIG. 13(f), the gearshift operating device of the present invention can be realized. Further, as indicated in the embodiment shown in FIG. 14, when the guide slit 40 is positioned between the shift selection shaft 16 and the shift finger 30, a slit having a shape which is line-symmetric to each of the shift patterns shown in FIGS. 13(a) to 13(f) is applied.

Meanwhile, between the projections 54 to 59 and the shift finger 30, as shown in FIG. 4, some gap must be provided. While the gap is moved in the shift direction, the shift finger moves in the selection direction, so that in order to realize the present invention, a gap of some size must be formed. When the gap is too large, the hysteresis of the shift fork shaft is increased, while when it is too small, the follower cannot be guided smoothly. A previous study shows that the size of the gap between the projections and the shift finger is preferably equal to or wider than the width of the shift finger.

Furthermore, the guide slit shown in FIG. 3 has linear slant parts. However, to smoothly move the follower in the shift direction and simultaneously guide it in the selection direction, the slant parts preferably have a bent shape. Further, the slant parts and parallel parts are preferably connected smoothly to each other.

Furthermore, to make the friction resistance between the follower 33 and the guide slit smaller, the follower is preferably provided with a roller. Also, as shown in FIG. 5, the shift finger 30 moves obliquely to enter between the projections 54 to 59, so that the corners of the shift finger 30 are preferably rounded so as to easily enter between the projections. Furthermore, the follower preferably has a clearance for the guide slit so as to generate good hysteresis in the trace of the shift finger 30.

The foregoing embodiments are directed to a device for operating the transmission of a car. However, the device may be applied similarly to gearshift test equipment and gearshift feeling evaluation equipment.

Further, as actuators for effecting operations in the shift direction and selection direction, not only motors, such as a DC motor, a DC brushless motor, and an AC motor, but also a hydraulic actuator and an air pressure actuator may be used. To obtain the same effects.

As explained above, according to the present invention, a guide slit having a plurality of slits parallel with the shift fork shafts and a plurality of slant slits concentrated to the neutral point from them is provided, and the follower is operated in accordance with the guide slit. Thus, the shift finger can perform the selection operation and simultaneously the gear dejoining or gear joining operation, so that the time required for the gearshift operation can be shortened and the power consumption can be reduced.

In addition, the actuator for the selection operation can be made compact, so that miniaturization and a reduction in the weight of the whole device can be realized. In an actual car, a gearshift operating device having a good loading property for performing a quick gearshift operation and for achieving a comfortableness in the ride can be realized. Further, the actuator for the selection operation can be omitted or miniaturized, so that the cost of the gearshift operating device can be reduced.

According to the present invention, the gearshift operation can be performed in a short time, and the gearshift operating device can be miniaturized and lightened.

What is claimed:

1. A gearshift operating device for a normally contact-mesh type transmission comprising a shift finger selectively engaged with or disengaged from shift fork shafts of said normally contact-mesh type transmission, a shift selection shaft including said shift finger, at least one electrically controllable driving means for driving said shift selection shaft in a gear shift direction parallel with said shift fork shafts, at least one electrically controllable driving means for driving said shift selection shaft in a gear selection direction perpendicular to said shift fork shafts, a follower formed integrally with said shift selection shaft, and a guide slit engaged by said follower to guide the movement of said shift selection shaft, wherein:
    said guide slit has a plurality of parallel slit parts parallel with said shift fork shafts and a plurality of slant slit parts converging so as to come to a point at a neutral position from said plurality of parallel parts.

2. A gearshift operating device for a normally contact-mesh type transmission comprising a shift finger selectively engaged with to or disengaged from shift fork shafts of said normally contact-mesh type transmission, a shift selection shaft including said shift finger, at least one electrically controllable driving means for driving said shift selection shaft in a gear shift direction parallel with said shift fork shafts, at least one electrically controllable driving means for pressing said shift selection shaft in a gear selection direction perpendicular to said shift fork shafts, a follower formed integrally with said shift selection shaft, and a guide slit engaged by said follower to guide the movement of said shift selection shaft, wherein:
    said guide slit has a plurality of parallel slit parts parallel with said shift fork shafts and a plurality of slant slit parts converging so as to come to a point at a neutral position from said plurality of parallel parts.

3. A gearshift operating device for a normally contact-mesh type transmission comprising a shift finger engaged with or disengaged from shift fork shafts of said normally contact-mesh type transmission, a shift selection shaft including said shift finger, at least one electrically controllable driving means for operating said shift selection shaft a gear shift direction parallel with said shift fork shafts, a follower formed integrally with said shift selection shaft, and a guide slit engaged by said follower to guide the movement of said shift selection shaft, wherein:
    said guide slit has a plurality of parallel slit parts parallel with said shift fork shafts and a plurality of slant slit parts converging so as to come to a point at a neutral position from said plurality of parallel parts, each slant slit part arranged in said guide slit having an electrically switched gate.

4. A gearshift operating device according to any one of claims 1 to 3, wherein said parallel slit parts of said guide slit and said slant slit parts of said guide slit are smooth curved slits continuously connected.

5. A gearshift operating device according to any one of claims 1 to 3, wherein said follower has a curved section.

6. A gearshift operating device according to any one of claims 1 to 3, wherein said follower has a roller.

7. A gearshift operating device according to any one of claims 1 to 3, wherein clearance of the engagement between said shift finger and said shift fork shafts is almost equal to or wider than the width of said shift finger.

8. A gearshift operating device according to any one of claims 1 to 3, wherein the width of said follower has some clearance for the width of said guide slit.

9. A gear shift operating device, for a contact-mesh type transmission, that selects a gear by the engagement of a shift fork shaft and a shift finger, comprising,
    a motor adapted to move the shift finger in a shift direction, and
    a guide slit, in the case of shifting from one gear to another gear, that can provide a force in a selection direction perpendicular to the shift direction to guide the shift finger because of a force of the motor in the shift direction, and that guides the movement of the shift finger toward a neutral position, said neutral position having one point,
    wherein in the case of shifting, shifting is completed by movement of the shift finger from a position of the shift fork shaft corresponding to one gear to that of the shift fork shaft corresponding to another gear via the neutral position.

10. The gear shift operating device according to claim 9, wherein the guide slit includes a plurality of slant parts connected so as to come to one point at the neutral position.

11. The gear shift operating device according to claim 10, wherein the guide slit includes a plurality of parallel parts connected to the plurality of slant parts.

12. The gear shift operating device according to claim 9, wherein in the case of shifting from one gear to another gear, shifting is completed by the motor continuing to operate.

13. The gear shift operating device according to claim 9, wherein said neutral position has only one point.

* * * * *